(12) United States Patent
Duran et al.

(10) Patent No.: US 7,747,881 B2
(45) Date of Patent: Jun. 29, 2010

(54) SYSTEM AND METHOD FOR LIMITING PROCESSOR PERFORMANCE

(75) Inventors: Francisco L. Duran, Austin, TX (US);
W. Paul Montgomery, Austin, TX (US);
David F. Tobias, Austin, TX (US)

(73) Assignee: GLOBALFOUNDRIES Inc., Grand Cayman (KY)

( * ) Notice: Subject to any disclaimer, the term of this patent is extended or adjusted under 35 U.S.C. 154(b) by 989 days.

(21) Appl. No.: 11/503,700

(22) Filed: Aug. 14, 2006

(65) Prior Publication Data
US 2008/0040622 A1 Feb. 14, 2008

(51) Int. Cl.
*G06F 1/28* (2006.01)
(52) U.S. Cl. .................................. 713/300; 713/320
(58) Field of Classification Search .............. 713/300, 713/310, 320, 340
See application file for complete search history.

(56) References Cited

U.S. PATENT DOCUMENTS

| | | | |
|---|---|---|---|
| 4,191,942 A | 3/1980 | Long | |
| 4,284,906 A | 8/1981 | Manfredi | |
| 4,855,622 A | 8/1989 | Johnson | |
| 5,719,800 A | 2/1998 | Mittal et al. | |
| 5,825,218 A | 10/1998 | Colli et al. | |
| 6,043,692 A | 3/2000 | Linoff | |
| 6,233,531 B1 | 5/2001 | Klassen et al. | |
| 6,624,681 B1 | 9/2003 | Loyer et al. | |
| 6,826,704 B1 | 11/2004 | Pickett | |
| 6,976,182 B1 | 12/2005 | Filippo | |
| 6,988,217 B1 | 1/2006 | Madrid et al. | |
| 2002/0194509 A1* | 12/2002 | Plante et al. | 713/300 |
| 2003/0110423 A1* | 6/2003 | Helms et al. | 714/100 |
| 2003/0135767 A1* | 7/2003 | Chu et al. | 713/300 |
| 2004/0030941 A1 | 2/2004 | Barr et al. | |
| 2004/0049709 A1* | 3/2004 | Wilson et al. | 713/500 |
| 2004/0064755 A1 | 4/2004 | Therien | |
| 2004/0255171 A1* | 12/2004 | Zimmer et al. | 713/300 |
| 2005/0283624 A1 | 12/2005 | Kumar et al. | |

FOREIGN PATENT DOCUMENTS

WO 0229535 4/2002

OTHER PUBLICATIONS

Written Opinion of the International Searching Authority; International application No. PCT/US2007/017997 for Advanced Micro Devices, Inc., mailed Jan. 16, 2008.
International Search Report, International application No. PCT/US2007/017997 for Advanced Micro Devices, Inc., mailed Jan. 16, 2008.

* cited by examiner

*Primary Examiner*—Mark Connolly
*Assistant Examiner*—Paul B Yanchus, III
(74) *Attorney, Agent, or Firm*—Rory D. Rankin; Meyertons Hood Kivlin Kowert & Goetzel, P.C.

(57) ABSTRACT

A system and method for managing performance states of a processor. An enclosure comprises a first processing board with a processor and a second processing board with a processor. A service processor may also be coupled to the enclosure via an interconnect. The second processing board is configured to store a value indicative of a maximum processor performance state for a processor on the second board. In response to a detected request for a transition to a first processor performance state, the processor on the second board is configured to transition to the first processor performance state, if the first processor state is less than or equal to the maximum processor performance state; and transition to the maximum processor performance state, if the first processor state is greater than the maximum processor state. The second processor board may store the value in response to a an operating environment condition detected elsewhere within the enclosure.

17 Claims, 6 Drawing Sheets

SYSTEM AND METHOD FOR LIMITING PROCESSOR PERFORMANCE

BACKGROUND OF THE INVENTION

1. Field of the Invention

This invention is related to computer systems and, more particularly, to managing processor performance.

2. Description of the Related Art

Computing systems today frequently include various mechanisms for monitoring an operating environment. For example, the Intelligent Platform Management Interface (IPMI) specification defines a set of common interfaces to computer hardware and firmware which allows system administrators to monitor system health and manage the system. Typically, a system motherboard may include a special microcontroller, such as a baseboard management controller (BMC), which supports IPMI functionality. The BMC manages the interface between system management software and platform hardware. IPMI operates independently of the operating system (OS) and allows administrators to manage a system remotely even in the absence of the OS or the system management software. IPMI works by defining how the BMC extends management capabilities in the server system and operates independent of the main processor by monitoring on-board instrumentation, such as temperature sensors, fan speed, and voltages. Through the BMC, IPMI also allows administrators to control power to the server, and remotely access BIOS configuration and operating system console information.

Generally speaking, sensors are built into the computer system and are polled by the BMC for data. Various conditions or parameters such as temperature, cooling fan speeds, power mode, operating system (OS) status, may be monitored and reported. In response to detecting various conditions, the BMC may alert a system administrator via the network. The administrator may then communicate with the BMC to take some corrective action such as resetting or power cycling the system to get a hung OS running again.

Processors today often include the ability to operate at various performance levels using operating system directed techniques. Differing processor performance levels are often used as part of a power and/or thermal management scheme. For example, if a system is running on battery power, then a reduced processor performance level may be utilized in order to provide a longer run time. Similarly, if it is detected that a processor operating temperature exceeds some predetermined threshold, then a reduced processor performance level may be selected in order to reduce the operating temperature. Various processor performance levels may sometimes be referred to as "P-states". Because operating systems are generally best suited for determining if a given processor is idle or being utilized (and to what extent), operating systems control the P-state values of a processor. Processors may, for example, comply with the Advanced Configuration and Power Interface (ACPI) specification as part of a power management scheme. Unfortunately, the operating system is ill equipped to understand other operating environment conditions.

For example, managing rack and blade system enclosure power and cooling requirements is essential to proper operation. However, the operating system on a single system in the enclosure can not understand that other systems are drawing excessive amounts of power during boot time and that its own P-state needs to be lowered before the power demand of the enclosure exceeds specified levels. Similarly, the operating system of a single system in the bottom of an enclosure may not be aware that systems higher in the enclosure are experiencing excessive heat problems and that its own P-state needs to be lowered to help resolve the problem (even though its own operating temperature is within normal parameters). Still further, the operating system is a complex mix of software components from many different providers. As a result, the operating system is not immune from crashing which can take down a P-state control daemon. If this happens there is currently no method of changing the P-state of the processor.

In view of the above, systems and methods are desired for managing processor performance.

SUMMARY OF THE INVENTION

Systems and methods for managing performance states of a processor are contemplated.

In one embodiment, an enclosure comprises a first processing board with a processor and a second processing board with a processor. Each of the processing boards may comprise server blades within a single enclosure. Given such an aggregation of systems in a single enclosure, operating environment conditions in one portion of the enclosure may affect other portions of the enclosure. In one embodiment, a service processor is coupled to the enclosure via an interconnect. The second processing board is configured to store a value indicative of a maximum processor performance state for a processor on the second board. In response to a detected request for a transition to a first processor performance state, the processor on the second board is configured to transition to the first processor performance state, if the first processor state is less than or equal to the maximum processor performance state; and transition to the maximum processor performance state, if the first processor state is greater than the maximum processor state. The second processor board may store the value in response to an operating environment condition detected elsewhere within the enclosure.

In one embodiment, the operating environment condition is detected by the first processing board and reported to the service processor. In response to the reported condition, the service processor conveys a command to the second processing board which is configured to store the value responsive to receiving the command. In addition, the processor on the second processing board may report to an operating system that it has transitioned to the first processor state, even if the processor has in fact transitioned to a maximum processor performance state which is different from the first processor state.

These and other embodiments are contemplated and will be appreciated upon reference to the following description and figures.

BRIEF DESCRIPTION OF THE DRAWINGS

Other objects and advantages of the invention will become apparent upon reading the following detailed description and upon reference to the accompanying drawings in which.

Figure 1:
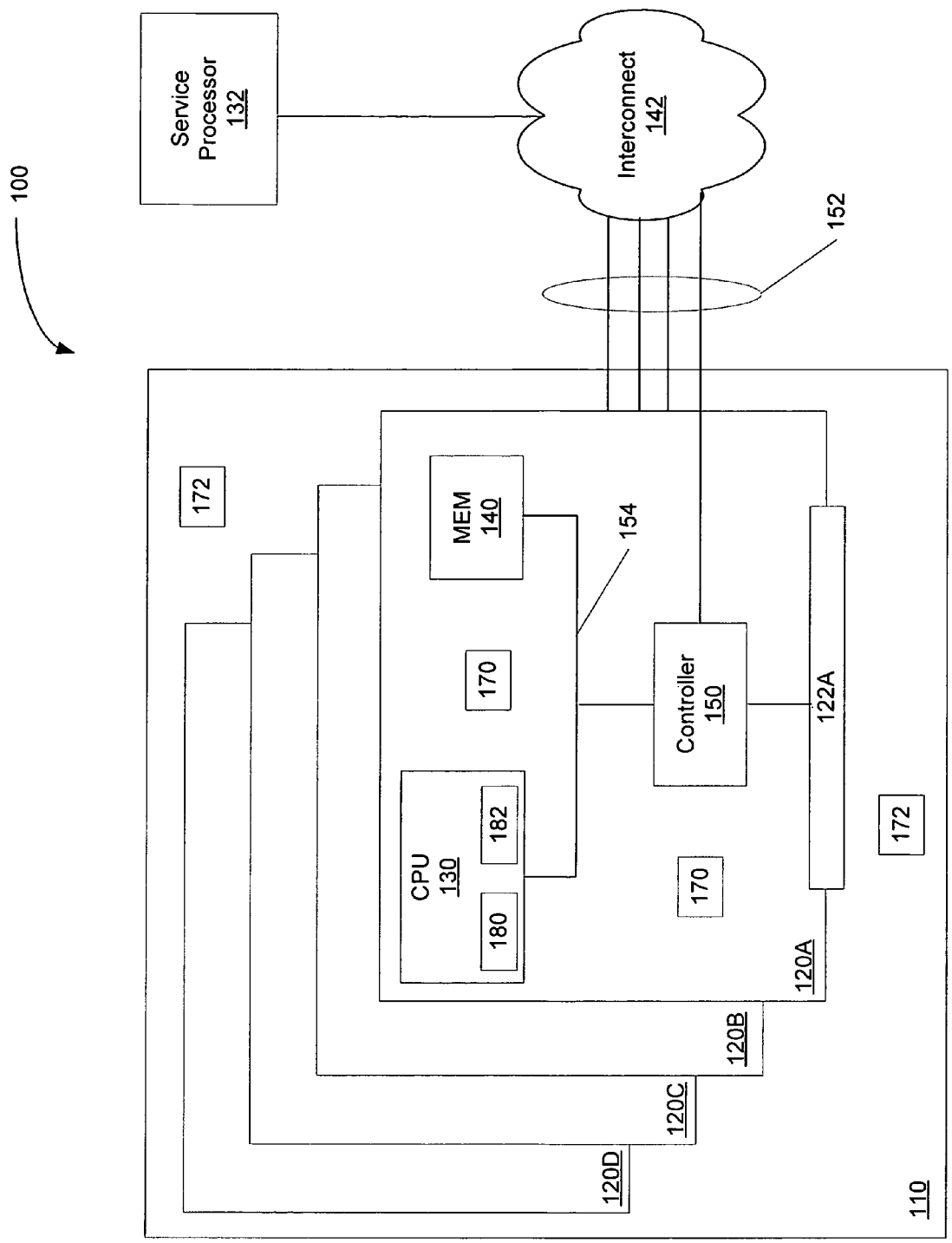
FIG. 1 is a block diagram of one embodiment of a computing system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

As discussed above, conditions in one part of an enclosure may go undetected in other parts of an enclosure. For example, while thermal conditions my be reaching unacceptable levels in a first part of an enclosure, processors in another part of the enclosure may continue to operate at full processor performance states. Consequently, resolving the unacceptable thermal problem may be difficult. Therefore, it is desirable to have other devices which are outside of the operating system or software be able to change a processors performance state (P-state) values. This entity may be referred to as a P-state Limit. In one embodiment, the P-state Limit comprises an externally accessible control register in the processor which contains the highest P-state value that the processor core may attain. When intelligence external to the operating system imposes a P-state Limit through the external command interface, the current core P-state will remain the same if it is at or below the performance level of the P-state Limit itself. If the current P-state of a core is in a higher performance mode than the P-state Limit, the core's P-state is changed to match the P-state Limit. Until the P-state Limit is lifted, the operating system or software may not set the real core P-state value higher than the P-state Limit. However, it may set the P-state to a lower performance state. In various embodiments, there may also be a P-state Limit locking capability. For example, a bit may be designated to determine if the P-state Limit should lock the core P-state to the P-state Limit value or not. Such locking capability may allow performance analysis to be made on a machine without the complexity of P-states changing.

FIG. 1 depicts one embodiment of a computing system. In the embodiment shown, an enclosure 110 is shown which includes four processor boards 120A-120D. In one embodiment, enclosure 110 comprises a blade enclosure and each of boards 120 may comprise server blades. However, non-blade embodiments utilizing an enclosure with processor boards are possible and are contemplated. Also shown in FIG. 1 is a service processor 132 coupled to enclosure 110 via interconnect 142. Interconnect 142 may, for example, comprise a local area network, the Internet, or any other suitable interconnect. As used herein, items referenced with a numeral followed by a letter may be collectively referred to by the reference numeral alone. For example, processor boards 120A-120D may collectively be referred to as processor boards 120. In the following, reference will generally be made to a server type enclosure and methods and mechanisms related thereto for ease of discussion. However, it is to be understood that an "enclosure" may comprise other types of enclosures than a server type enclosure. For example, in FIG. 1, enclosure 102 may represent a data center. Such a data center may include multiple servers and/or other devices. Accordingly, the term enclosure is not be limited to that depicted in the figures.

In the example shown, board 120A includes a central processing unit (CPU) 130, memory (MEM) 140, and management controller 150. In one embodiment, management controller 150 comprises a baseboard management controller (BMC) configured to support operations in compliance with the Intelligent Platform Management Interface (IPMI) specification. Generally speaking, IPMI is an interface standard which may be used to monitor a computing system and its health. Other non-IPMI based embodiments are possible and are contemplated. Other boards 120B-120D may be configured similar to that of board 120A.

In one embodiment, each of boards 120 may be coupled to a backplane type circuit board (not shown). For example, board 120A is shown coupled to a connector 122A, which in turn may serve to connect board 120A to a backplane. Also shown in the embodiment of FIG. 1 are sensors 170 and 172. Sensors 170 are shown to be mounted on board 120A, and sensors 172 are shown to be external to boards 120. Sensors 172 could, for example, be associated with a backplane or other board or within enclosure 110. Sensors 170, 172 may be configured to detect various operating conditions of the system 100. Such conditions may include temperature, cooling fan speeds, power mode, operating system (OS) status, and so on.

In one embodiment, controller 150 is configured to monitor operating conditions of the system 100 via the sensors 170 and/or 172. In addition, controller 150 is shown to be coupled via bus 152 to interconnect 142. In this manner, service processor 132 may access controller 150 (as well as other controllers within enclosure 110) in order to monitor operating conditions. In the embodiment shown, controller 150 is coupled to CPU 130 via bus 154. In one embodiment, bus 154 comprises an out-of-band communication link such as an SMBus. However, any suitable communication link between controller 150 and other components or devices within enclosure 110 may be utilized.

In the embodiment shown, CPU 130 includes registers 180 and 182. Register 180 may comprise a register for use in association with power and/or performance management (e.g., for ACPI related functionality). For example, register 180 may include data indicative of a P-state of the processor. In one embodiment, P-states of the processor may range from 0-5, with 0 representing a highest performance level, and 5 representing a lowest performance level (e.g., idle state). However, any suitable range and number of P-states may be utilized. Further, a write to register 180 may initiate a change in a P-state of the CPU 130. In various embodiments, register 180 may not be accessible to entities external to CPU 130. Register 182 comprises a processor performance "limit" register which is accessible to entities external to CPU 130. In one embodiment, CPU 130 utilizes both of registers 180 and 182 in managing the performance states (P-states) of the processor. In the example shown, register 182 may be accessed by controller 150. As controller 150 is accessible by service processor 132, and/or other devices within enclosure 110 (e.g., via backplane bus), register 182 may generally be accessed through controller 150 by a variety of entities external to CPU 130. It is noted that while two distinct registers 180 and 182 are shown, any suitable storage devices may be utilized. For example, a single memory device which includes portions which are externally accessible and portions which are not externally accessible may be used.

As discussed above, sensors may be built into the computer system and report to the BMC. Various conditions or parameters such as temperature, cooling fan speeds, and power mode may be monitored and reported. In response to detecting various conditions, the BMC may provide an alert which may then be conveyed to a system administrator via the network. Generally speaking, an external entity such as controller 150 may not directly access or control the processor state of CPU 130. However, in the embodiment shown, controller 150 may indirectly affect the P-states of CPU 130 via register 182. In particular, as described below, controller 150 may limit the P-state of the CPU 130 by setting a maximum P-state for the CPU 130. Register 182 may also include data (e.g., a bit) which indicates the currently set P-state limit is to be locked at the P-state limit. Generally speaking, a processor includes an externally accessible register (P-state limit register) configured to store data which indicates a maximum P-state at which the processor may operate. When the processor detects a P-state transition is requested (e.g., by the operating system), reference is made to the P-state limit register in order to determine whether the requested P-state conflicts with a current maximum P-state. In addition, a change in the P-state limit may also cause the processor to initiate a check that the current P-state is not in conflict with the newly set limit.

In contrast to the server type example, a data center 102 may have limitations or operating conditions which lead to a change in the P-state of systems operating within the data center 102. For example, data center 102 may have power limitations which in turn force P-state limits on the systems operating within the data center 102. In other cases, service processor 132 may detect conditions within the data center 102 are such that a reduced P-state for systems in the data center is desired. For example, service processor 132 may receive reports several servers (e.g., server 110 and others not shown) that indicate thermal conditions within the data center itself are becoming problematic. In response, service processor could convey commands to any number of servers in the data center 102 which limit their P-states. Numerous such alternatives are possible and are contemplated.

Figure 2:
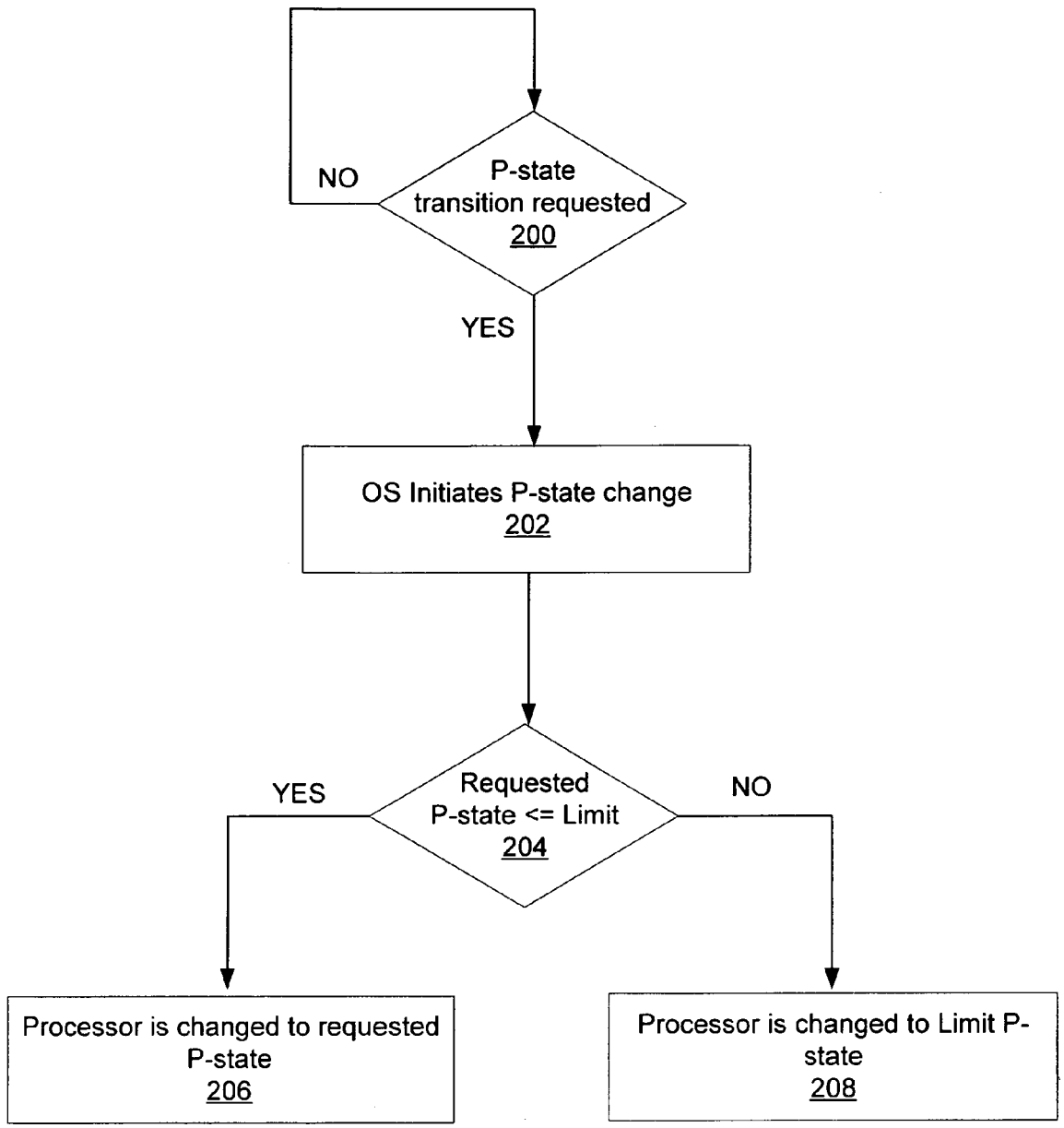
FIG. 2 depicts one embodiment for managing processor performance states.

Turning now to FIG. 2, one embodiment of a method for managing the P-states of a processor is shown. In the example shown, a processor P-state change is initiated by an operating system in a processor configured to support P-states limits. As shown, if a transition to a new P-state is requested (decision block 200), the operating system may then initiate the P-state change (block 202). In response, the processor determines whether the requested new P-state is less than or equal to a P-state limit which has been set (decision block 204). If the requested P-state is less than or equal to the limit, then the processor transitions to the newly requested P-state. In one embodiment, the transition to a new P-state may comprise the operating system making a call to a processor driver, the driver changing a voltage of the processor if needed in preparation for the P-state change, the driver changing the processor to the new P-state, and a change in the processor voltage required for the new P-state.

On the other hand, if the requested P-state is not less than or equal to the limit, then there is a conflict between the newly requested P-state and the established limit. In such a case, the processor may change the P-state, but not to a value which is greater than the limit. In other words, the processor may change the P-state to equal the limit (block 208). Therefore, while the operating system may make initiate a change to a desired P-state, the actual P-state which results may be limited. Further, the operating system may not be aware that the P-state was limited. In this manner, the P-state limit places a cap on the performance state of the processor.

Figure 3:
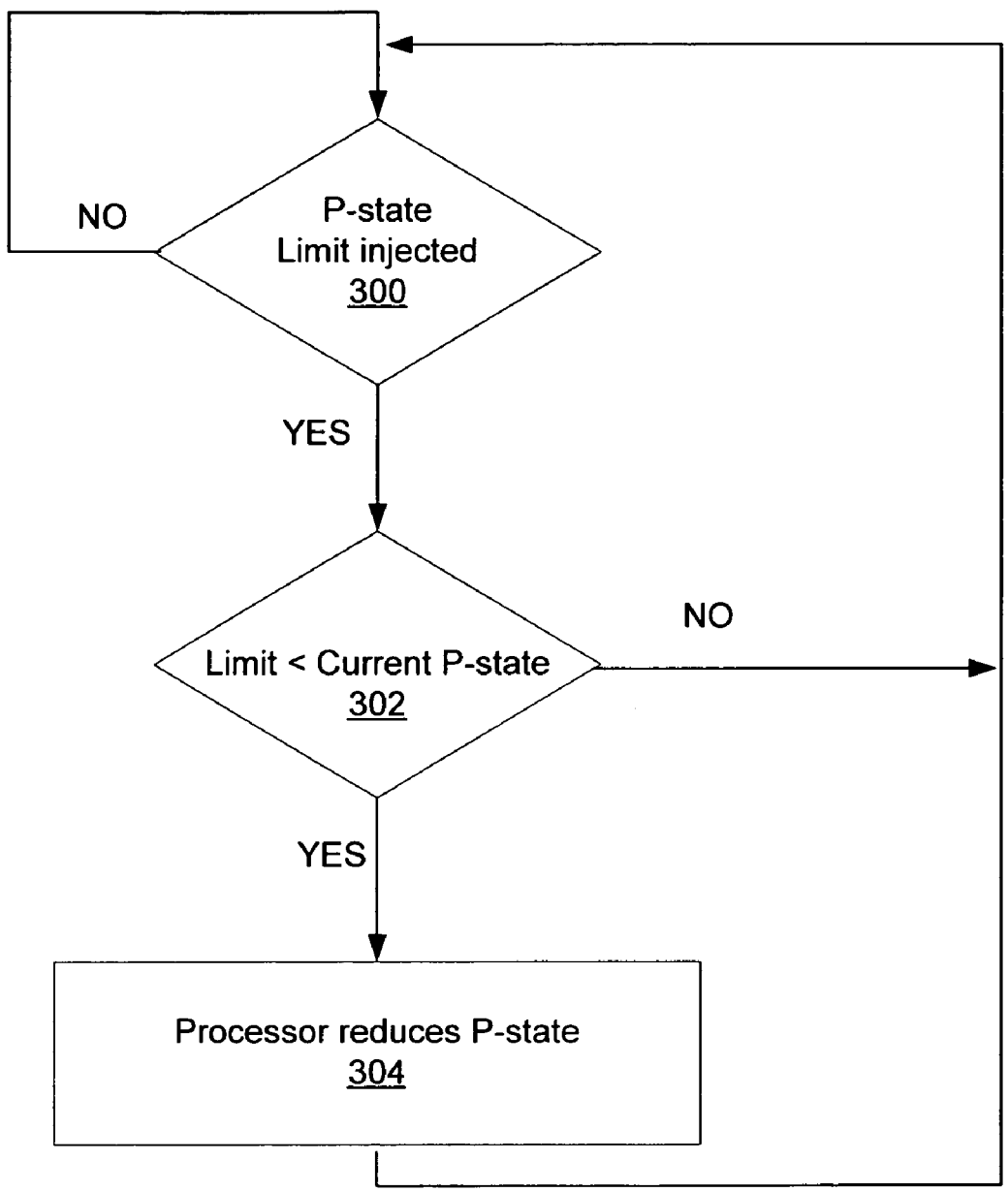
FIG. 3 depicts one embodiment of a method for injecting a performance state limit in a processor.

FIG. 3 depicts an alternative scenario. While FIG. 2 illustrates a scenario in which an operating system initiates a P-state change, FIG. 3 depicts a scenario wherein a new P-state limit is "injected" into a processor by an external entity. For example, the controller 150 of FIG. 1 may inject a P-state limit into CPU 130 by performing a write to register 182. Responsive to the injection of a P-state limit (decision block 300), the processor may detect the injected P-state (e.g., by detecting a write to the register) and determine whether the newly injected P-state is lower than the current P-state of the processor (decision block 302). If not, then no change in the processor P-state is performed. However, if the injected limit P-state is less than the current P-state, then the processor initiates a change in the processor P-state to that of the newly injected P-state. In this manner, the operating system based mechanism for changing P-states is bypassed.

In one embodiment, the processor P-state limits are totally transparent to the operating system. For example, if the operating system requests a change to a P-state of 3, then the processor may simply acknowledge and report to the operating system that the P-state has been changed to a state of 3—even though the processor P-state may have actually been limited to a different value. In such an embodiment, the operating system continues with information which indicates that the processor is currently operating at a P-state 3. If the operating system requests a change to a P-state which exceeds a current limit, then the processor may report making such a change, but make no change in the P-state at all. In other embodiments, the operating system may be provided accurate information regarding P-state changes.

Figure 4:
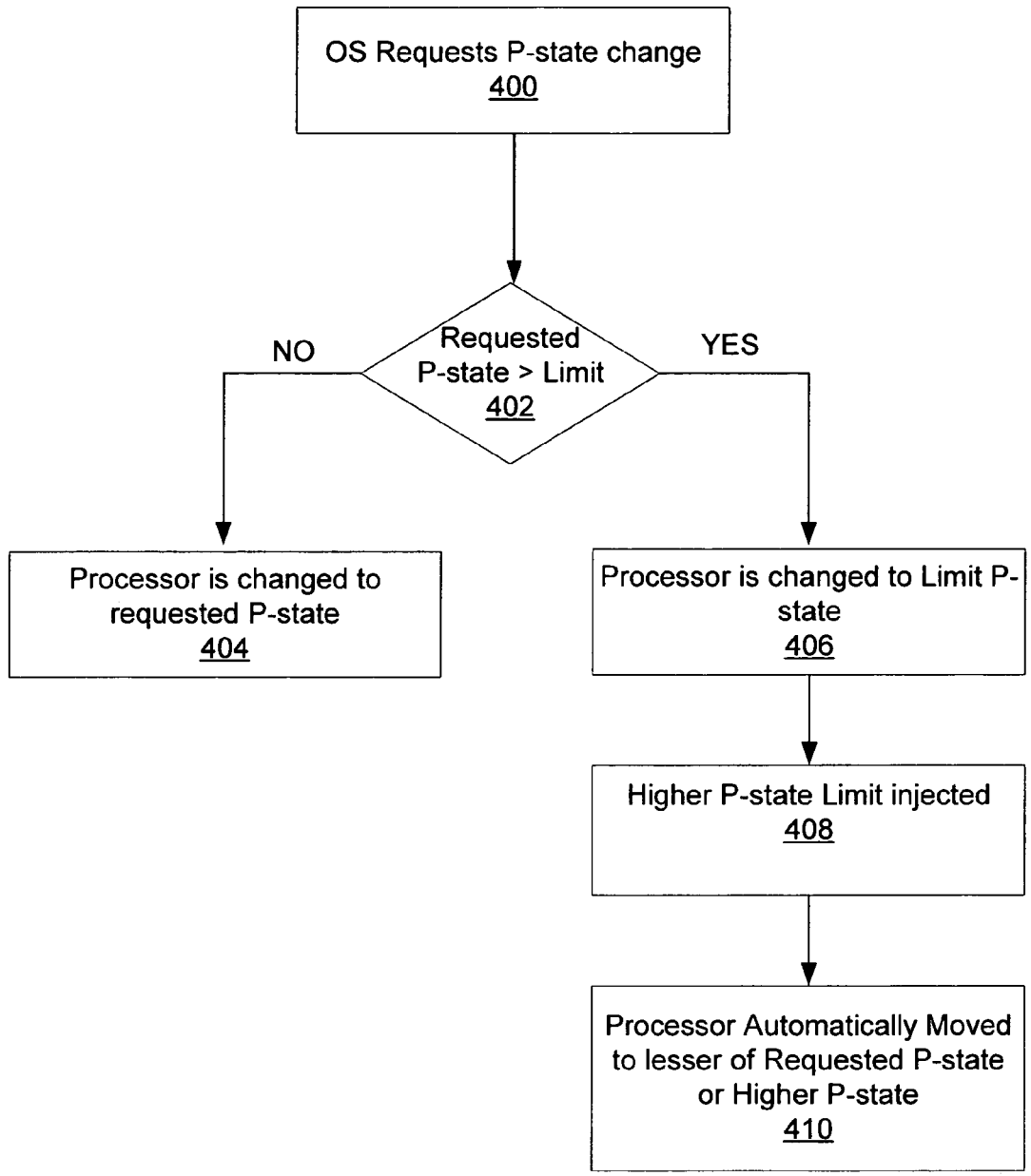
FIG. 4 depicts one embodiment of a method for managing processor performance states in a system.

Turning now to FIG. 4, one embodiment of a method is shown which illustrates an interplay between an operating system based mechanism and processor based mechanism for changing P-states. In the example shown, an operating system may request or otherwise initiate a P-state change (block 400). If the requested P-state is not greater than a current P-state limit (decision block 402), then the processor may be changed to the requested P-state. If the requested P-state is greater than the limit P-state (decision block 402), then the processor P-state is changed to the limit P-state instead of the requested P-state. Subsequently, a higher P-state limit may be injected as described above (block 408). As the previous P-state requested by the operating system was higher than the current limit P-state, the processor is moved to the lesser of the newly injected P-state limit or the previously requested P-state. Numerous such scenario are possible and are contemplated.

Figure 5:
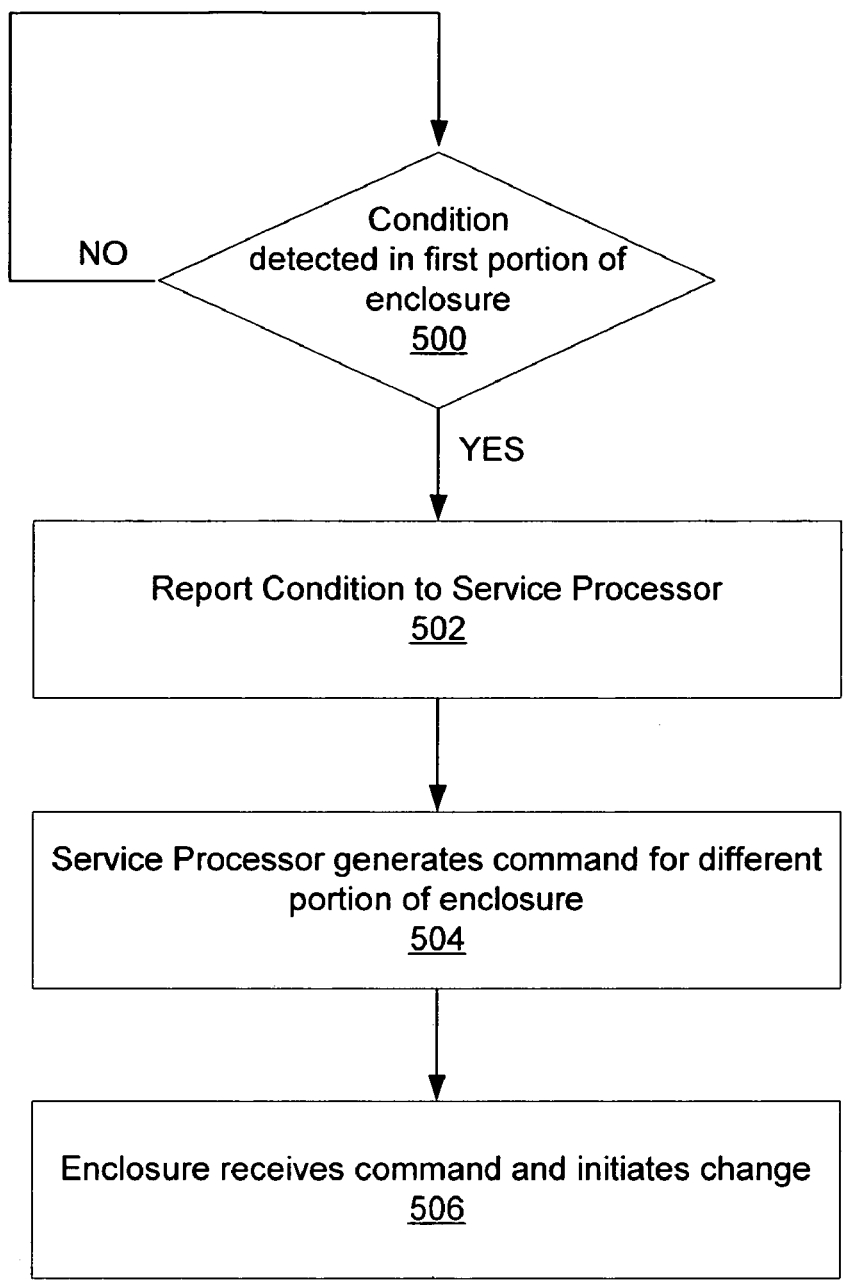
FIG. 5 depicts one embodiment of a method for managing processor performance states in a system.

Turning now to FIG. 5, one embodiment of a method is shown for utilizing the above described methods and mechanisms in a system. As discussed above, monitoring components in one part of an enclosure may not be aware of conditions in other parts of an enclosure. Therefore, while conditions for a processor in one portion of an enclosure are becoming problematic, a processor in another portion of the enclosure may have no knowledge of any such problems. Consequently, one processor may continue to operate at full performance and power, generating a significant amount of heat, while another processor is operating at above desired thermal conditions. Utilizing the above described approaches, processor performance in various portions of an enclosure may be changed in response to conditions elsewhere within an enclosure.

In FIG. 5, a condition may be detected in one portion of an enclosure (decision block 500). For example, a controller (such as controller 150 in FIG. 1) on one server blade may detect thermal conditions are reaching unacceptable levels. In response, processor performance on that blade may be reduced. At the same time, a server blade elsewhere within the same enclosure may detect no thermal problems by its sensors/monitors. Consequently, the processor on this blade may continue operating at full performance—thereby generating additional heat within the disclosure.

In response to the detected thermal conditions on the first server blade, the condition may be reported (block 502) to a service processor and/or administrators console. The service processor may provide an alert which can then be acted on manually by an administrator, or automatically by software. In response, the service processor may generate and issue commands to one or more devices in the enclosure (block 504). For example, in response to the reported thermal condition in a first part of the enclosure, the service processor may convey a command(s) to one or more blades other than the blade reporting the condition. Such other blades may reside in a different part of the enclosure than the reporting blade. The command(s) may include P-state limit commands which cause processors on the one or more other blades to limit the P-state to a reduced value. A similar command may also be conveyed to the reporting blade. In this manner, P-states of processors other than the processor immediately affected by the thermal condition may be changed. Consequently, a more complete view of the enclosure as a whole may be maintained, and conditions responded to accordingly.

Figure 6:
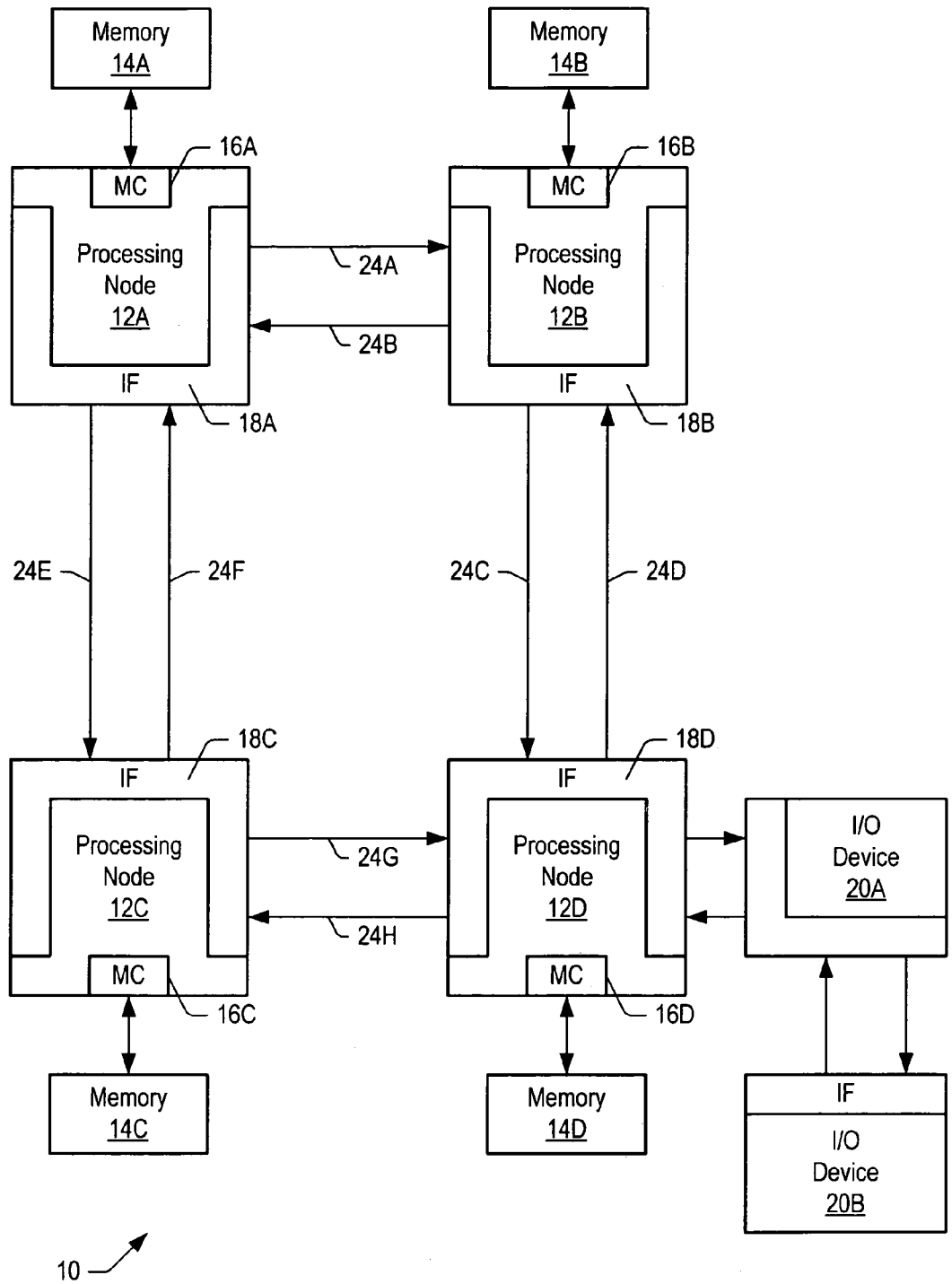
FIG. 6 is a block diagram of one embodiment of a computing system.

FIG. 6 depicts one embodiment of a computer system 10 which may incorporate the methods and mechanisms described above. Computer system 10 includes a plurality of processing nodes 12A, 12B, 12C, and 12D. Each processing node is coupled to a respective memory 14A-14D via a respective memory controller 16A-16D. Additionally, each processing node 12A-12D includes interface logic 18A-18D used to communicate with others of the processing nodes 12A-12D. For example, processing node 12A includes interface logic 18A for communicating with processing nodes 12B and 12C. Similarly, processing node 12B includes interface logic 18B for communicating with processing nodes 12A and 12D, and so on. In the embodiment of FIG. 6, processing node 12D is shown coupled to communicate with an input/output (I/O) device 20A via interface logic 18D, and I/O device 20A is further coupled to a second I/O device 20B. Other processing nodes may communicate with other I/O devices in a similar fashion. Alternatively, a processing node may communicate with an I/O bridge which is coupled to an I/O bus.

Computer system 10 may implement a packet-based link for inter-node communication. In the depicted embodiment, the link is implemented as sets of unidirectional lines (e.g. lines 24A are used to transmit packets from processing node 12A to processing node 12B and lines 24B are used to transmit packets from processing node 12B to processing node 12A). Other sets of lines 24C-24H are used to transmit packets between other processing nodes as illustrated in FIG. 6. The link may be operated in a cache coherent fashion for communication between processing nodes or in a non-coherent fashion as a daisy-chain structure between I/O devices 20A-20B (and additional I/O devices, as desired). It is noted that a packet to be transmitted from one processing node to another may pass through one or more intermediate nodes. For example, a packet transmitted by processing node 12A to processing node 12D may pass through either processing node 12B or processing node 12C as shown in FIG. 6. Any suitable routing algorithm may be used. Other embodiments of computer system 10 may include more or fewer processing nodes than the embodiment shown in FIG. 6. In addition, other embodiments are possible in which each processing node is coupled to every other processing node through a point-to-point network.

In addition to the depicted memory controller and interface logic, each processing node 12A-12D may include one or more processors and associated caches, as described further below. Broadly speaking, a processing node comprises at least one processor and may optionally include a memory controller for communicating with a memory and other logic, as desired. It is noted that the terms "processing node" and "processor node" may be used interchangeably herein.

Memories 14A-14D may comprise any suitable memory devices. For example, a memory 14A-14D may comprise one or more RAMBUS DRAMs (RDRAMs), synchronous DRAMs (SDRAMs), DRAM, static RAM, etc. The address space of computer system 10 is divided among memories 14A-14D. Each processing node 12A-12D may include a memory map used to determine which addresses are mapped to which memories 14A-14D, and hence to which processing node 12A-12D a memory request for a particular address should be routed. The particular processing node associated with a given memory address may be referred to herein as the home node of that address. In one embodiment, the coherency point for an address within computer system 10 is the memory controller 16A-16D coupled to the memory storing bytes corresponding to the address. Memory controllers 16A-16D may comprise control circuitry for interfacing to memories 14A-14D. Additionally, memory controllers 16A-16D may include request queues for queuing memory requests.

Generally, interface logic 18A-18D may comprise buffers for receiving packets from the link and for buffering packets to be transmitted upon the link. Computer system 10 may employ any suitable link level flow control mechanism for transmitting packets reliably. Communications between processing nodes 12A-12D of computer system 10 may be accommodated using various specific packet-based messaging, as desired.

I/O devices 20A-20B are illustrative of any desired peripheral devices. For example, I/O devices 20A-20B may comprise network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. For example, while the above discussion refers to power or thermal conditions, P-state limits may be used for any desired reason. For example, P-state limits could be changed to provide more processing power to a system which is currently highly utilized. At the same time, P-state limits could be changed to reduce processing power for a system which is underutilized. Numerous such scenarios are possible and are contemplated. It is intended that the following claims be interpreted to embrace all such variations and modifications.

What is claimed is:

1. A method for managing processor performance, the method comprising:

storing a value indicative of a maximum processor performance state;

detecting a request for a transition to a first processor performance state;

transitioning the processor to the first processor performance state, in response to determining the first processor state is less than or equal to the maximum processor performance state;

transitioning the processor to the maximum processor performance state, in response to determining the first processor state is greater than the maximum processor state; and reporting to an operating system that the processor has transitioned to the first processor state, in response to determining the first processor state is greater than the maximum processor state.

2. The method as recited in claim 1, wherein storing said value is responsive to a detected operating environment condition.

3. The method as recited in claim 2, wherein said condition comprises a thermal condition.

4. The method as recited in claim 2, further comprising:
   detecting said operating environment condition in a first portion of an enclosure;
   reporting the operating environment condition to a remote service processor;
   conveying a command from the service processor to a second portion of the enclosure; and
   storing the value responsive to receiving the command.

5. The method as recited in claim 4, wherein said operating environment condition is not detected in said second portion of the enclosure.

6. The method as recited in claim 1, wherein the value indicative of a processor performance state is stored in an externally accessible register of the processor.

7. A system for managing processor performance, the system comprising:
   an enclosure comprising a first processing board which comprises a processor, and a second processing board which comprises a processor; and
   a service processor coupled to the enclosure via an interconnect;
   wherein the second processing board is configured to:
      store a value indicative of a maximum processor performance state;
      detect a request for a transition to a first processor performance state;
      transition the processor in the second processing board to the first processor performance state, in response to determining the first processor state is less than or equal to the maximum processor performance state;
      transition the processor in the second processing board to the maximum processor performance state, in response to determining the first processor state is greater than the maximum processor state; and
      report to an operating system that the processor has transitioned to the first processor state, in response to determining the first processor state is greater than the maximum processor state.

8. The system as recited in claim 7, wherein the value stored in the second processing board is responsive to a detected operating environment condition.

9. The system as recited in claim 8, wherein said condition comprises a thermal condition.

10. The system as recited in claim 8, wherein the operating environment condition is detected by the first processing board and reported to the service processor, and wherein in response to the reported condition, the service processor conveys a command to the second processing board which is configured to store the value responsive to receiving the command.

11. The system as recited in claim 10, wherein said operating environment condition is not detected in said second portion of the enclosure.

12. The system as recited in claim 7, wherein the value indicative of a processor performance state is stored in an externally accessible register of the processor on the second board.

13. A system for managing processor performance, the system comprising:
   a controller configured to monitor operating environment conditions; and
   a processor comprising an externally accessible register, wherein the processor is configured to:
      detect a request for a transition to a first processor performance state;
      access the register to determine a maximum processor performance state;
      transition the processor to the first processor performance state, in response to determining the first processor state is less than or equal to the maximum processor performance state;
      transition the processor to the maximum processor performance state, in response to determining the first processor state is greater than the maximum processor state; and
      report to an operating system that the processor has transitioned to the first processor state, in response to determining the first processor state is greater than the maximum processor state.

14. The system as recited in claim 13, wherein the controller is configured to store a value indicative of the maximum processor performance state responsive to a detected operating environment condition.

15. The system as recited in claim 14, wherein said condition comprises a thermal condition.

16. The system as recited in claim 13, wherein the operating environment condition is detected by a device external to the processor and controller, and wherein the controller is configured to store said value in response to a command received from a service processor.

17. The system as recited in claim 13, wherein the controller comprises a baseboard management controller.

* * * * *